US011621777B2

(12) United States Patent
Frozenfar

(10) Patent No.: US 11,621,777 B2
(45) Date of Patent: Apr. 4, 2023

(54) VIRTUAL OPTICAL EDGE DEVICE

(71) Applicant: Sealight Technologies, Inc., Santa Clara, CA (US)

(72) Inventor: Moshe Frozenfar, Palo Alto, CA (US)

(73) Assignee: Sealight Technologies, Inc., Santa Clara, CA (US)

( * ) Notice: Subject to any disclaimer, the term of this patent is extended or adjusted under 35 U.S.C. 154(b) by 85 days.

(21) Appl. No.: 17/380,252

(22) Filed: Jul. 20, 2021

(65) Prior Publication Data

US 2021/0351847 A1 Nov. 11, 2021

Related U.S. Application Data

(63) Continuation of application No. 16/805,840, filed on Mar. 2, 2020, now Pat. No. 11,101,889.

(60) Provisional application No. 62/813,016, filed on Mar. 2, 2019.

(51) Int. Cl.
  *H04B 10/27* (2013.01)
  *H04B 10/25* (2013.01)
  *H04B 10/2575* (2013.01)

(52) U.S. Cl.
  CPC . *H04B 10/25891* (2020.05); *H04B 10/25751* (2013.01); *H04B 10/27* (2013.01)

(58) Field of Classification Search
  CPC .......... H04L 12/4641; H04B 10/25891; H04B 10/27
  See application file for complete search history.

(56) References Cited

U.S. PATENT DOCUMENTS

| | | | | |
|---|---|---|---|---|
| 7,912,082 B2* | 3/2011 | Yang | .................... | H04L 49/9063 370/463 |
| 11,101,889 B2* | 8/2021 | Frozenfar | .............. | H04B 10/27 |
| 2004/0090980 A1* | 5/2004 | Song | .................... | H04J 3/1694 370/445 |
| 2006/0271988 A1* | 11/2006 | Chapman | ........... | H04N 7/17309 725/111 |
| 2009/0304022 A1* | 12/2009 | Yang | .................... | H04L 49/9063 370/463 |
| 2010/0293233 A1* | 11/2010 | Salam | ................. | H04L 12/4641 709/206 |
| 2011/0318002 A1* | 12/2011 | Sitton | ................ | H04Q 11/0067 398/58 |
| 2014/0314413 A1* | 10/2014 | Zheng | ................. | H04L 12/2885 398/67 |

(Continued)

*Primary Examiner* — Tanya T Motsinger
(74) *Attorney, Agent, or Firm* — Sunstein LLP

(57) ABSTRACT

A framework for virtual network element of optical access networking has been designed to provide a cloud-residing core system (i.e., Mobile core controller or SDN controller) for running higher layers without requiring dedicated hardware at the edge of the network. In this framework, a service operator can create multiple optical access network connections for serving a single or multiple types of wired or wireless subscriber by programming (via software) optical ports of a Virtual Optical Edge Device to perform the desired MAC and/or PHY layer of a selected optical protocol. The Virtual Optical Edge Device in turn performs the desired PHY function or MAC and PHY function of selected protocol per each southbound port. The Virtual Optical Edge Device performs data abstraction function on all data associated with southbound ports and presents the core network a unified API via its northbound ports.

4 Claims, 13 Drawing Sheets

(56) References Cited

U.S. PATENT DOCUMENTS

| | | | |
|---|---|---|---|
| 2016/0088377 A1* | 3/2016 | Peng | H04L 41/0806 398/45 |
| 2016/0119058 A1* | 4/2016 | Wang | H04B 10/272 398/58 |
| 2018/0145746 A1* | 5/2018 | Finkelstein | H04L 69/08 |
| 2018/0175924 A1* | 6/2018 | Ercan | H04W 76/16 |

* cited by examiner

VIRTUAL OPTICAL EDGE DEVICE

BACKGROUND OF THE INVENTION

Optical fiber is considered as the medium of choice for delivering high-speed data services. Over time multiple fiber related access technologies have been developed to accommodate various market needs.

Fiber networks are extensively used in Cable Television (CATV) networks, in Fiber to the premises (FTTP) or Fiber to the curb (FTTC) networks, in Fixed Wireless Access (FWA) and, used in cellular networks.

Cable television (CATV) systems utilize an architecture called Hybrid Fiber Coax (HFC), as illustrated in FIG. 1. The HFC architecture relies on a mixture of fiber optic technology and coaxial cable-based transmission technology. The cable TV system is comprised of a central, facility called a head-end office 1, where central equipment controlling much of the cable system resides. The optical node 5 is coupled to the head-end office 1 via an IP optical transport fiber 4, coaxial (coax) distribution network 6, and equipment at customer premises 7. The head-end office 1 can serve a very large number of customers, often an entire city or a metro area. The head-end office 1 uses fiber optic cables to cover long distances between its location and optical node locations. Fiber optic medium is well suited for this portion of the network due to its ability to propagate optical signals across long distances with small signal power losses. The coax portion of the network generally covers short distances due to its relatively high signal power losses.

FIG. 2 illustrates additional details pertaining to the various functions involved in the delivery of data, video and voice to CATV customers. Virtual Cable Modem Termination System (vCMTS) 201 includes all the higher-level functions of Data Over Cable Service Interface Specification (DOCSIS), including the Medium Access Control (MAC) functions. The vCMTS 201 communicates with Remote physical layer (or PHY) Device (RPD) 207 via optical link 205, using Internet Protocol (IP) packet format. RPD 207 implements the physical layer of the DOCSIS protocol. RPD 207 converts IP type data packets received from vCMTS 201 to RF modulated data and transmits the RF data to the connected Cable Modems (CM) 209 via coaxial plant 208. In the opposite direction, cable modems 209 transmit burst of RF data toward RPD 207 via the coaxial plant 208, where the RPD 207 converts the RF data bursts to IP packets format and transmits the data packets to vCMTS 201 via fiber span 205.

The CATV system as described has several disadvantages. RPD 207 includes power hungry electronics required to transform IP data packets to RF modulated data. Extending the RF spectrum on the coaxial plant 208 in the future to achieve additional system capacity gains results in RPD 207 devices that will require even more power. Legacy fiber nodes that are in use were designed with heat dissipation levels that are well below RPD 207 requirements, therefore upgrading legacy system with node based RPD would require complete forklifting of the installed fiber nodes.

Extending the optical fiber deeper into the network edge reduces or eliminates RF amplifiers which enhances system capacity but at the same time increases the number of optical nodes substantially. As can be observed in FIG. 3, as the number of optical nodes 306 is increased, the number of required RPD devices is also increased, leading to increased cost and increased power consumption.

Additional limitation of the system as described is lack of support for fiber connected subscribers. Legacy HFC systems rely on Radio Frequency over Glass (RFoG) technology to connect CATV subscribers directly with fiber which is often used in low-density residential and commercial applications.

FIG. 4 illustrates a fiber to the premises (FTTx) system utilizing Passive Optical Networking (PON) and Active Optical Networking (AON) techniques. AON systems offer a point-to-point fiber connection between the subscriber and edge of the operator's network. This method offers simplicity, high throughput, and security. The drawback of this method is the resulting high number of optical ports in the operator's edge and therefore limiting the scale of such a system. AON type fiber to the home (FTTH) systems rely on a centrally located IP switch 407 with point-to-point optical connections 409 to each customer premises Media Converter (MC) 410. The illustrated topology is a logical presentation of the network, were operators often use Wave Division Multiplexing (WDM) to use a single fiber span 409 to service multiple MC 410. The Passive Optical Network (PON) method includes several variations that have been introduced over time. In its simplest form, a common optical line termination (OLT) function is placed in the operator's edge, connecting with multiple subscribers using only a single fiber and passive optical splitters. In the downstream direction, the OLT 411 broadcasts to all connected optical network units (ONUs) 416. In the upstream direction, each ONU send bursts of upstream data. To avoid collisions between data bursts originating from a number of connected ONUs 416, the OLT 411 provides the ONUs 416 with timing synchronization and burst timing controls. Other variations of basic PON include the use of DWDM technology, tunable lasers, tunable optical receivers and more advance forms of bursting to provide higher throughput. PON provides better scaling than the active Ethernet model but it imposes some limitations, such as reduced downstream throughput, upstream bandwidth inefficiencies related to bursting mechanisms, and some risk of data breach due to its inherent shared medium architecture. Passive Optical Networking (PON) are designed to save multiple optical port terminations at the central OLT 411. ONU devices 416 share a single fiber span 413 and rely on a passive optical power splitter 414 for physical connection to the common OLT 411. Operators have the flexibility to locate the optical splitter 414 at a central location close to the OLT 411 or alternatively place it deeper in the outside plant near the end users.

FIG. 5 illustrates an enhanced PON system, where the functions of a traditional OLT have been split. A white box OLT 501, featuring multiple PON ports 503, performs all the PON physical layer functions and some lower level MAC functions and communicates with a cloud-based Software Defined Networking (SDN) controller 508 via IP transport 507. The OLT upper layer MAC and management functions are performed in SDN software, hence referred to as virtual OLT. Over time, the Full Service Access Network (FSAN) group and the International Telecommunication Union (ITU) have standardized many numbers of PON protocols, including but not limited to Asynchronous PON (APON), Broadband PON (BPON), Gigabit PON (GPON), Ethernet PON (EPON), 10 Gbit/s Ethernet PON (10G-EPON), DOCSIS provisioning of EPON (DPoE), 10 Gigabit Symmetrical PON (XGS-PON), Time and Wavelength Division Multiplexed PON (TWDM-PON), and Next-Generation-PON2 (NG-PON2). Each protocol has unique physical layer and MAC layer requirements. Service operators are forced to choose among the various PON protocols carefully since each PON version entails dedicated hardware and dedicated management software implementation. Operators tend to standardize on a single PON protocol for their entire network to save cost but in the process give up flexibility, resulting in an inability to capitalized on new business opportunities.

FIG. 6 illustrates a Fixed Wireless Access (FWA) system. The FWA is a method of connecting a wireless base station to the provider's network via fiber, where the base station in turn connects with a single or multiple subscribers' wireless modems. This method has the potential to save the cost of trenching fiber to each subscriber, but it has all the limitations of PON with additional limitations associated with the frequency availability on the RF spectrum, line of sight related limitations, and security risks. As illustrated in FIG. 6, Remote Radio (RR) 601 is receiving and transmitting data packets from an IP network 603 via fiber link 602. RR 601 also receives control messages and transmits various status data to the Radio Control 605 via the same fiber link 602. RR 601 establishes a wireless link with wireless modem 606, typically installed at the customer premises. Wireless modem 606 in turn converts wireless data destined to/from its customer to/from a wired data port 607.

Although the telecommunications industry has standardized many aspects of the described system, most equipment vendor have added proprietary features into their equipment, forcing service operators to install remote radio units and radio controllers manufactured by same equipment vendor. This leads to increased cost and lack of flexibility to adopt newer or lower cost equipment offered by other industry vendors.

FIG. 7 illustrates a cellular network with multiple Remote Radios (RR) 706 that support specific over-the-air, wireless standards, such as 2G, 3G, 4G or 5G. Handset 707 and other compatible mobile devices connect with their nearest RR using RF spectrum allocated by their service provider.

Remote Radio (RR) 706 communicates with Base Band Unit 701 over Fronthaul span 705. Remote Radio (RR) 706 may employ multiple protocols to communicate with BBU 701. Newer RR 706 units that are 4G or 5G typically use Enhanced Common Public Radio Interface (eCPRI), Radio Over Ethernet (RoE), or Common Public Radio Interface (CPRI) protocols, while older RR 706 units may use an Open Base Station Architecture Initiative (OBSAI) or slower-rate CPRI protocol. Base Band Unit 701 in turn communicates with mobile Core Network 704 using the Internet Protocol.

The Core Network 704 implements most of the high-level functions of a cellular communication network. It is a mix of hardware and software that includes the mobile user related data base, mobility management, session setup and tear down and mobile user authentication and tracking. The Core Network 704 also performs all the required functions to perform handover of a mobile user from one RR 706 unit to the next RR 706 unit as the mobile user travels away from its connected RR 706 and enters the edge of an adjacent cell.

Most installed mobile networks utilize CPRI protocol for fronthaul 705 access. Fronthaul access is the optical link between Remote Radio 706 units and the BBU 701. Remote Radio 706 units can be installed at remote cell sites that could be up to tens of kilometers away from the centrally located BBU 701. CPRI is a semi-standard, multi-rate, synchronous protocol. The telecommunications industry has standardized many aspects of the CPRI protocol, but most equipment vendors have added proprietary features into their CPRI protocol implementation, forcing service operators to install Remote Radio units and Base Band Units manufactured by same equipment vendor. This leads to increased cost and lack of flexibility to adopt newer or lower cost equipment offered by other industry vendors.

The proliferation of mobile networks can partially be attributed to the constant upgrade of these systems over time, from 2G to 3G to 4G/LTE. Each upgrade resulted in higher network capacity and enablement of newer applications that were not possible with older and slower systems. Upgrading installed 4G networks to 5G introduces new challenges. 5G requires much higher density of remote radio sites for coverage of the same geographical area. 5G delivers the highest capacity when allocated with wider RF bandwidth, typically available in higher RF frequencies, referred to as high-band or millimeter wave. However, an area with dense foliage or building fitted with low emissivity glass prevent consistent reception of high-band RF signals by mobile users. To remedy these shortcomings, mobile operators plan to enable 5G type RR 706 units to perform load balancing and sharing of high-band and 4G spectrum, resulting in seamless experience by 5G enabled mobile users. To achieve this task, mobile operators would require full interoperability between the Core Network and BBU unit with legacy 4G-type RRU and newer 5G-type RRU. This interoperability currently can be attained by deploying all network components supplied by a single vendor.

BRIEF SUMMARY OF THE INVENTION

Disclosed herein is a virtual optical edge device as specified in the independent claims. Embodiments of the present invention can be freely combined with each other if they are not mutually exclusive.

According to one embodiment of the present invention, a virtual optical edge device includes: a virtual fiber abstraction component (VFAC) coupled to a northbound port, the northbound port coupled to a network controller over a single-standard application program interface (API); and a set of southbound virtual ports. The set of southbound virtual ports includes: a plurality of virtual medium access control (vMAC) resources coupled to the virtual fiber abstraction component; and a plurality of virtual physical layer (vPHY) resources coupled to the plurality of vMAC resources and a plurality of access links coupled to a plurality of optical node units, the plurality of access links configured to perform functions according to a plurality of fiber access protocols. A first given southbound virtual port of the set of southbound virtual ports is coupled to a first given access link of the plurality of access links. The first given access link is configured to perform functions according to a first given fiber access protocol of the plurality of fiber access protocols. The first given southbound virtual port includes: a first given vMAC resource of the plurality of vMAC resources coupled to the VFAC and programmed to perform MAC layer functions of the first given fiber access protocol; and a first given vPHY resource of the plurality of vPHY resources coupled to the first given vMAC and to the given access link. The first given vPHY resource programmed to perform physical layer functions of the first given fiber access protocol. A second given southbound virtual port of the set of southbound virtual ports is coupled to a second given access link of the plurality of access links. The second given access link configured to perform functions according to a second given fiber access protocol different from the given fiber access protocol. The second given southbound virtual port includes: a second given vMAC resource of the plurality of vMAC resources coupled to the VFAC and programmed to perform MAC layer functions of the second given fiber access protocol; and a second given vPHY resource of the plurality of vPHY resources coupled to the second given vMAC and to the second given access link, the second given vPHY resource programmed to perform functions according to the second fiber access protocol. The VFAC is programmed to mediate between the single-standard API and the given southbound virtual port by translating data flow between the first given fiber access protocol and the network protocol. The VFAC is further programmed to mediate between the second given southbound virtual port and the single-standard API by translating data flow between the second given fiber access protocol and the network protocol.

In one aspect, the set of southbound virtual ports is coupled to a set of remote radios, wherein each southbound virtual port of the set of southbound virtual ports is programmed to perform functions according to a fiber access protocol used by a corresponding remote radio of the set of remote radios.

In another aspect, the single-standard API interfaces with the network controller selected from the group consisting of a physical network controller and a virtual network controller.

In another aspect, the single-standard API interfaces with the network controller selected from the group consisting of: a cable modem termination system (CMTS); a virtual CMTS; a virtual software defined networking (SDN) controller; a mobile core controller; a virtual mobile core controller.

DETAILED DESCRIPTION OF THE INVENTION

Figure 1:
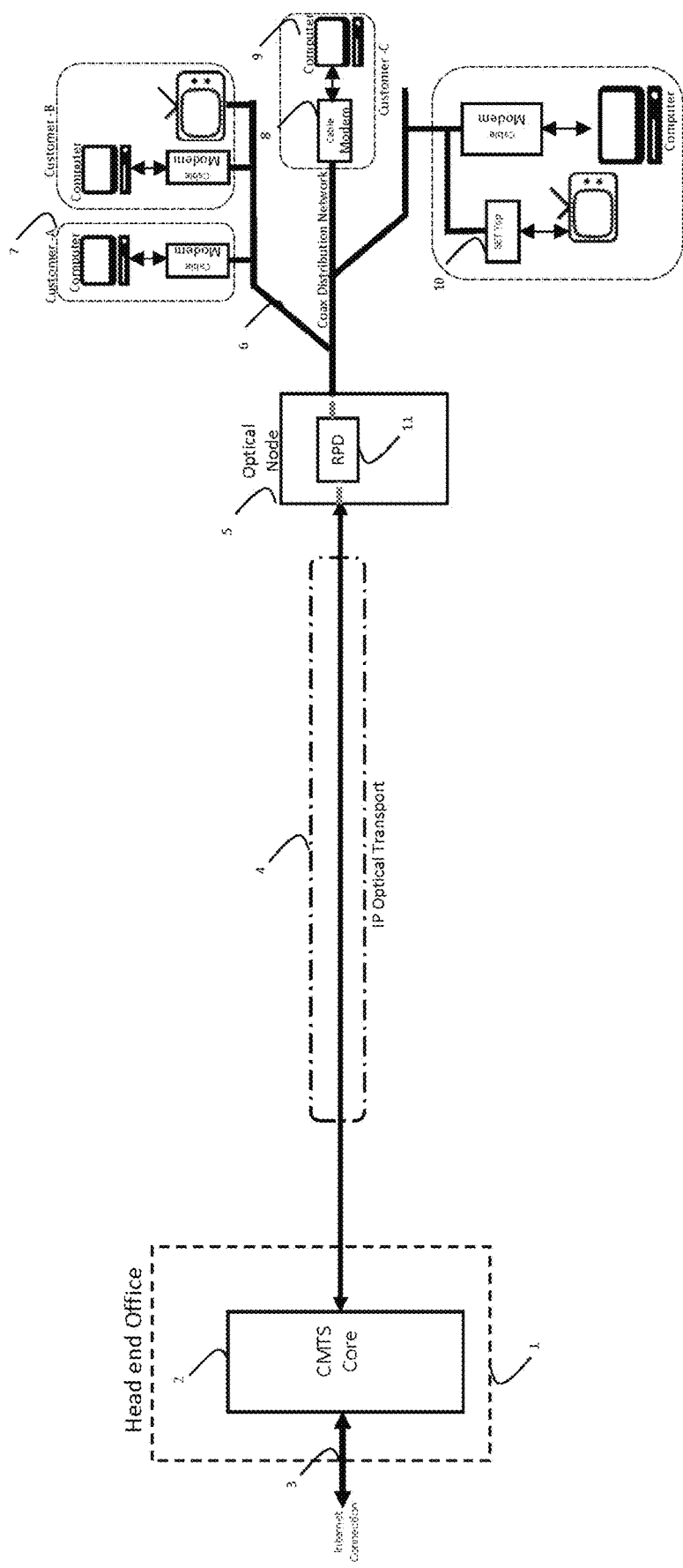
FIG. 1 illustrates a cable television (CATV) system utilizing a Hybrid Fiber Coax (HCF) architecture.
Figure 2:
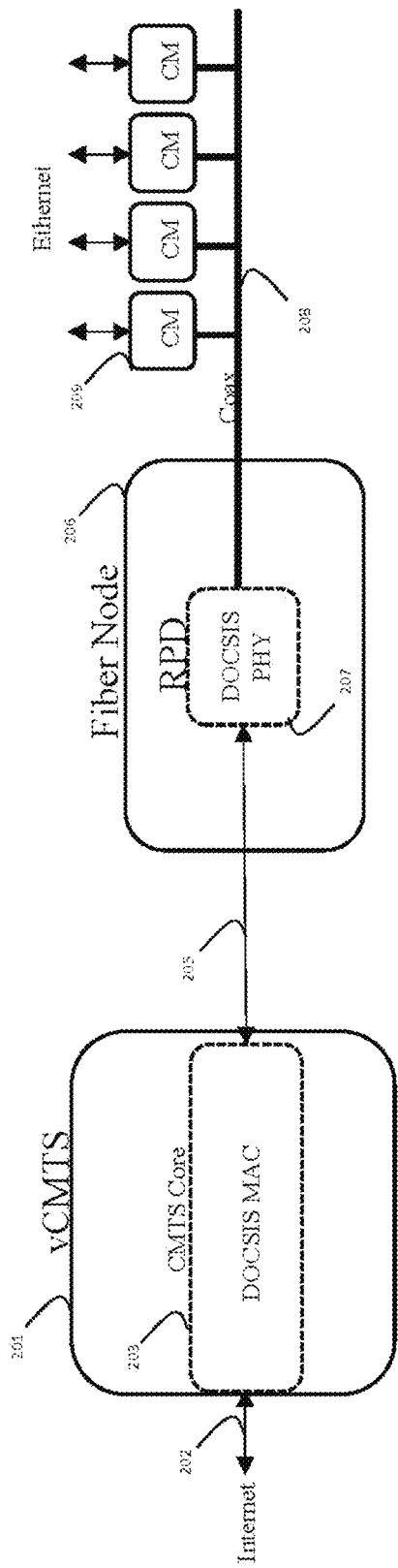
FIG. 2 illustrates additional details pertaining to various functions involved in the delivery of data, video and voice to CATV customers.
Figure 3:
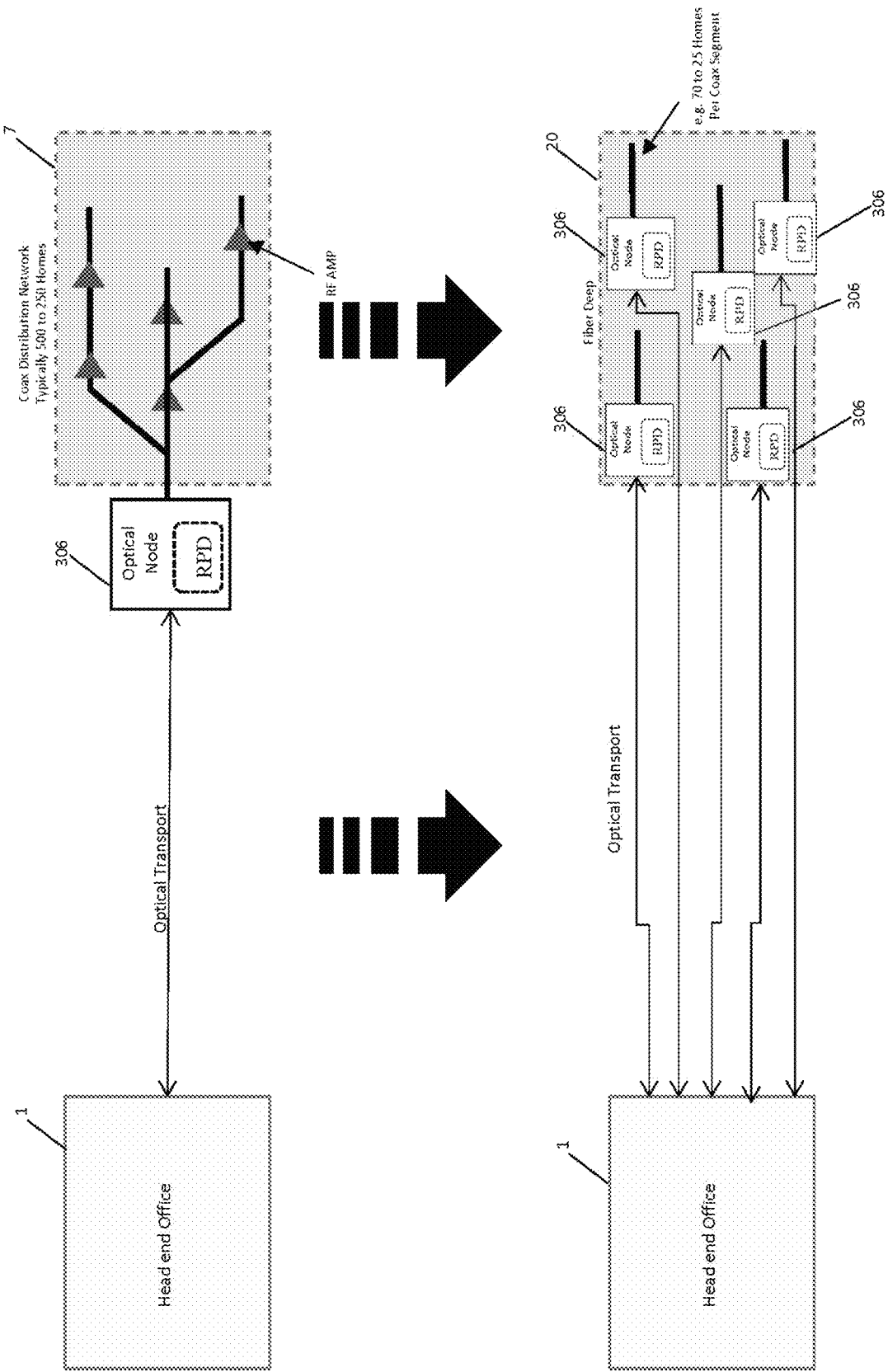
FIG. 3 illustrates the increase in the number of optical nodes when optical fiber is extended deeper, into the network edge.
Figure 4:
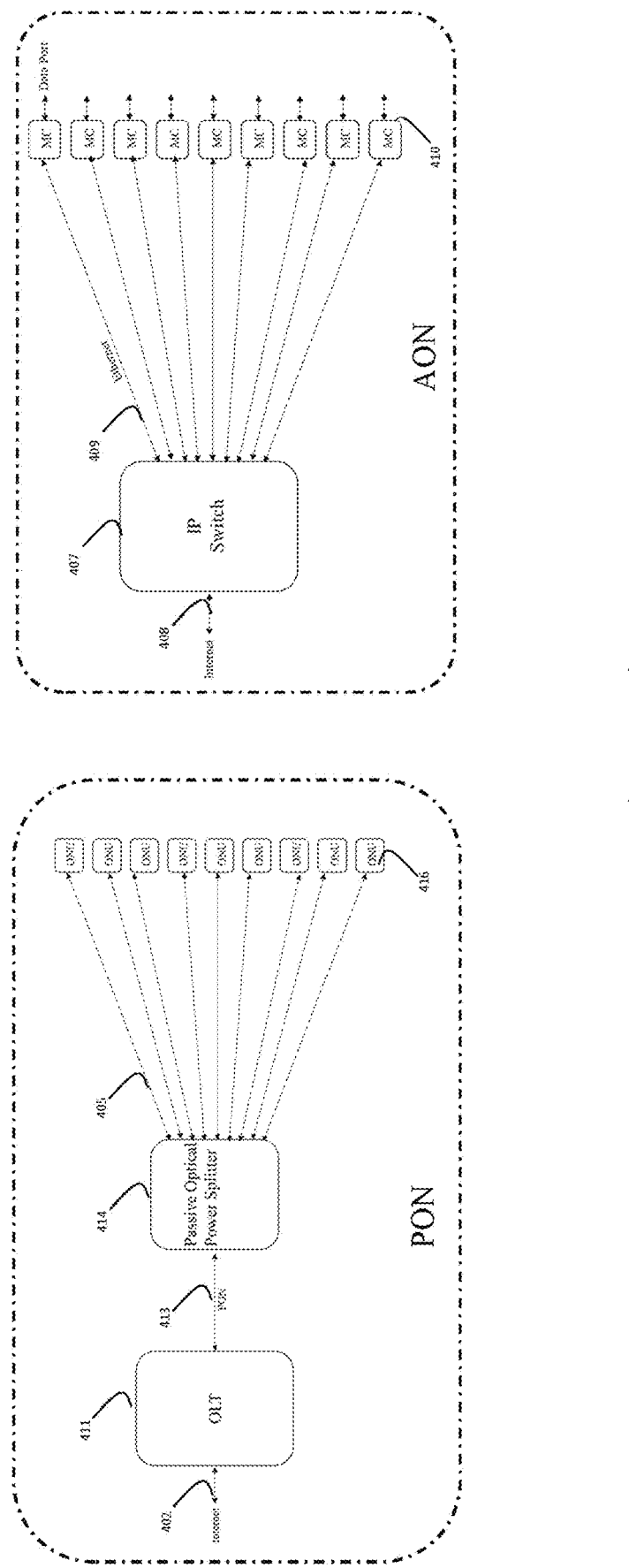
FIG. 4 illustrates a fiber to the premises (FTTx) system utilizing Passive Optical Networking (PON) and Active Optical Networking (AON) techniques.
Figure 5:
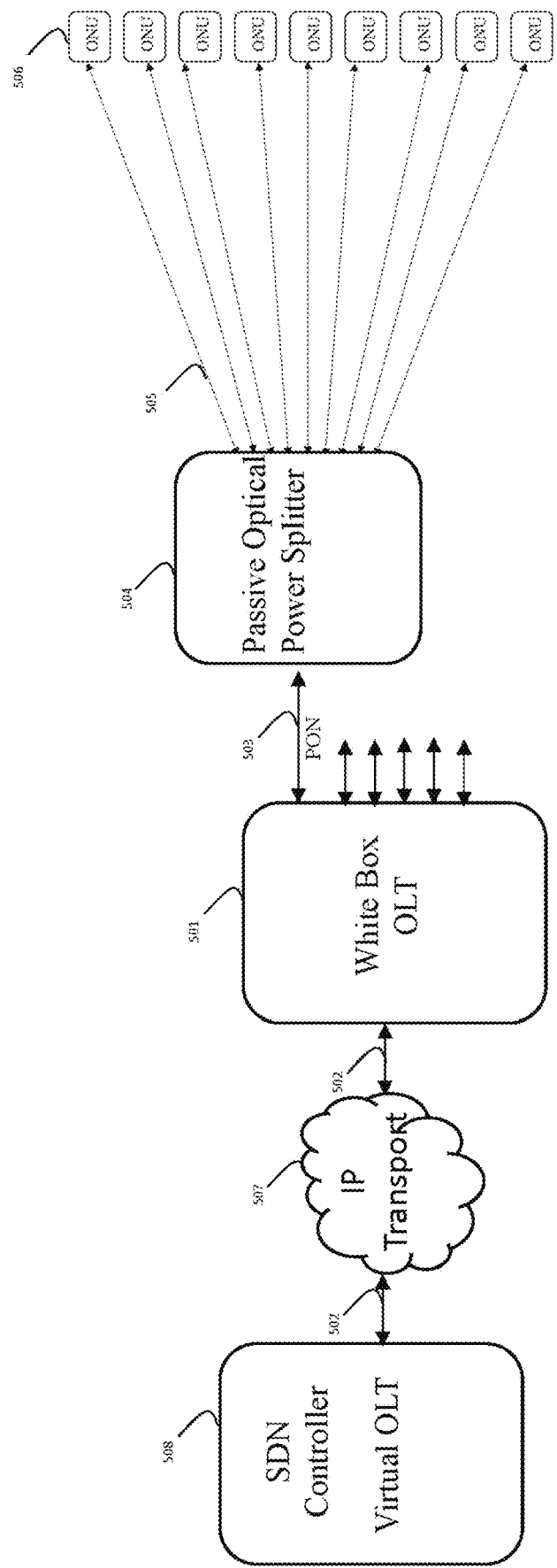
FIG. 5 illustrates an enhanced PON system, where the functions of a traditional OLT have been split.
Figure 6:
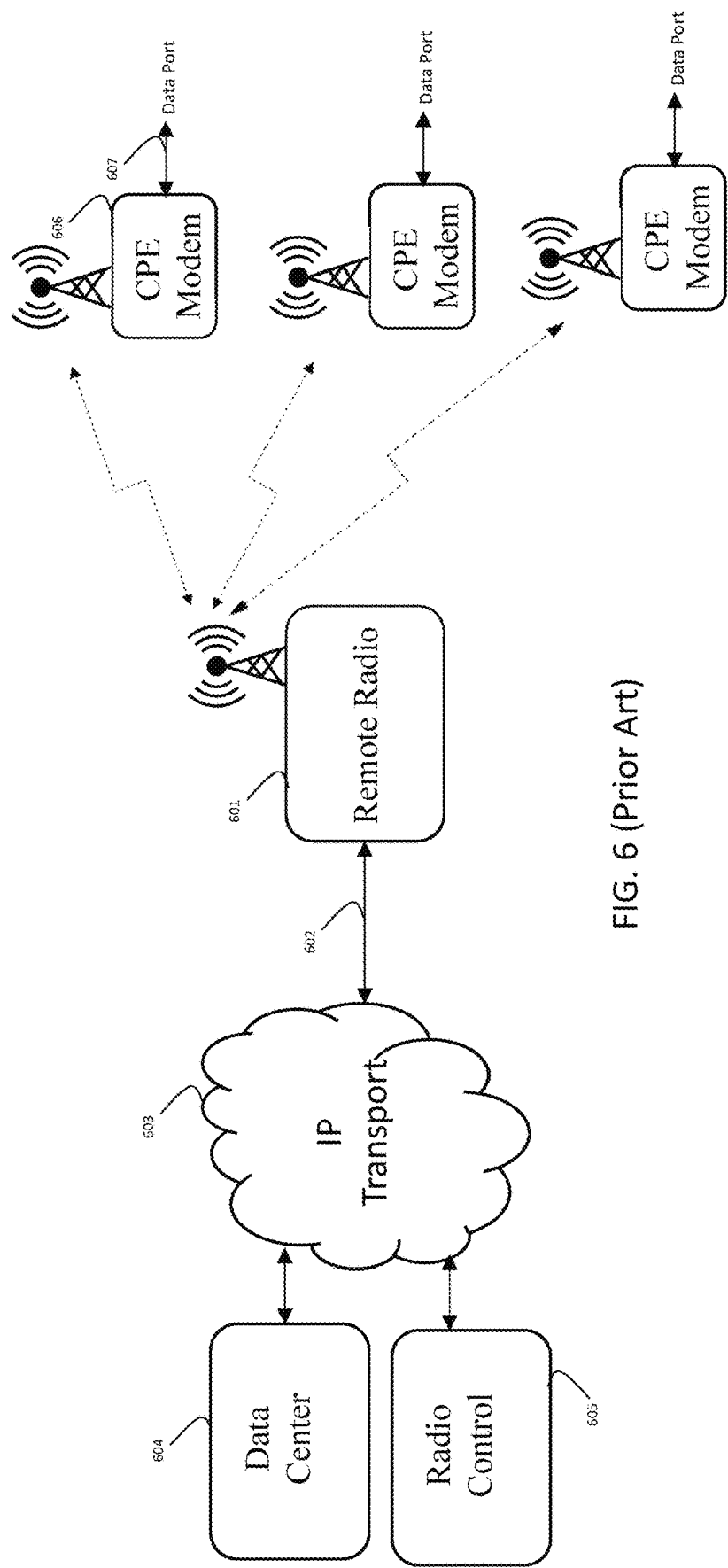
FIG. 6 illustrates a Fixed Wireless Access (FWA) system.
Figure 7:
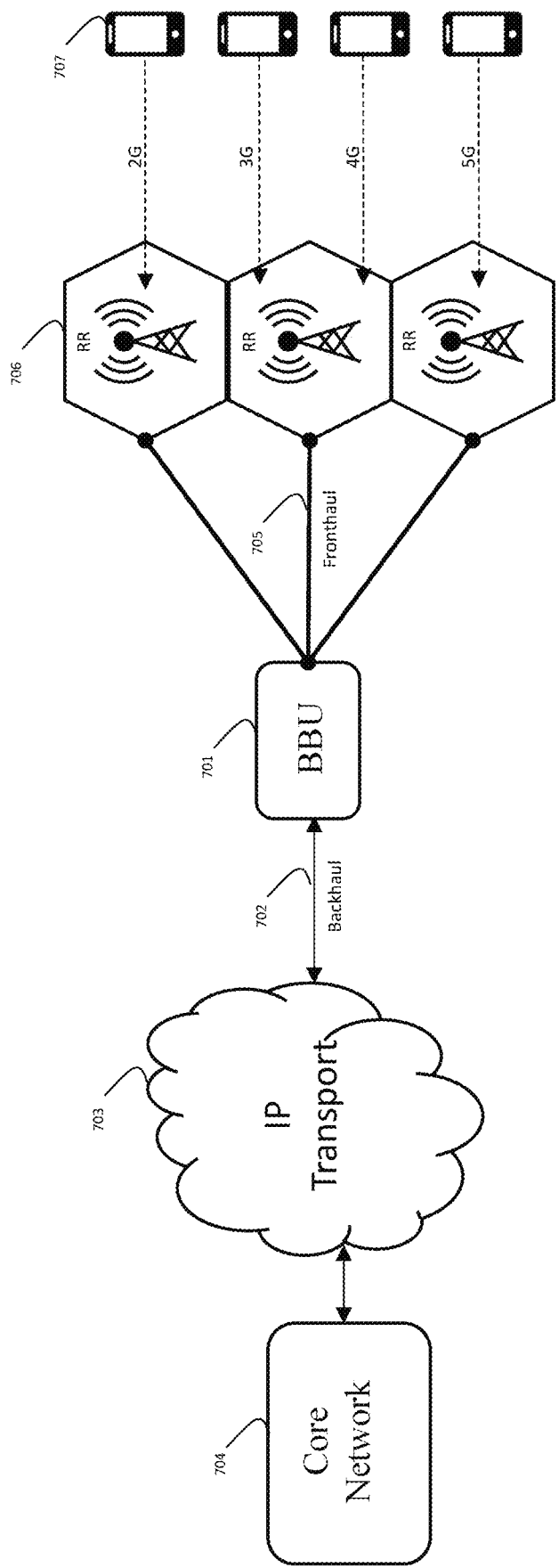
FIG. 7 illustrates a cellular network with multiple Remote Radios (RR).

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIGS. 1-13 se the following reference numerals:
1 Head-End Office
2 Cable Modem Termination System Core
3 Fiber Span
4 IP Optical Transport Fiber
5 Optical Node
6 Coaxial Distribution Network
7 Customer Premises
8 Cable Modems
9 Computer
10 Set Top Box
11 Remote PHY Device
20 Fiber Deep Network
201 Virtual Cable Modem Termination System
202 Fiber Span
203 Cable Modem Termination System Core
205 Optical Link
206 Fiber Node
207 Remote PHY Device
208 Coaxial Plant
209 Cable Modems
306 Optical Nodes
307 Coax Distribution Network
402 Fiber Span
405 Fiber Spans
407 IP Switch
408 Fiber Span 409 Optical connection
410 Media Converters
411 Optical Line Termination
413 Single Fiber Span
414 Optical Splitter
416 Optical Node Units
501 White Box Optical Line Termination
502 Fiber Span
503 Passive Optical Network Ports
504 Passive Optical Power Splitter
505 Fiber Spans
506 Optical Node Units
507 IP Transport
508 Software Defined Networking Controller
601 Remote Radio
602 Fiber Link
603 IP Transport Network
604 Data Center
605 Radio Control
606 Wireless Modem
607 Wired Data Port
701 Base Band Unit
702 Backhaul Span
703 IP Transport Network
704 Core Network
705 Fronthaul Span
706 Remote Radios
707 Handset
801 Virtual Fiber Abstraction Component
802 Virtual Medium Access Control Resources
803 Virtual Physical Layer Resources
804 Transceivers
805 Access Links
806 Optical Span
807 Network Controller
808 Virtual Optical Edge Device
809 Virtual Ports
902 Virtual Medium Access Control Resources
903 Virtual Physical Layer Resources
904 Southbound Physical Ports
906 Virtual Physical Layer Resource
908 Virtual Optical Edge Device
1002 Northbound Adapter
1003 Northbound Adapter
1004 xPON Adapter
1005 Active-Ethernet Adapter
1006 DOCSIS Adapter
1007 RRH Adapter
1008 Common Control & Management Component
1009 Northbound Link to vCMTS Core
1010 Northbound Link to SDN Controller
1011 Southbound Virtual MAC/PHY Port
1012 Southbound Virtual MAC/PHY Port
1013 Southbound Virtual MAC/PHY Port
1014 Southbound Virtual MAC/PHY Port
1101 Virtual Optical Edge Device
1102 XGS-PON Operation
1103 Southbound Port
1104 1:n Splitter
1105 Fiber Spans
1106 Optical Node Units
1107 GPON Operation
1108 Southbound Port
1109 1:n Splitter
1110 Fiber Spans
1111 Optical Node Units
1112 10G-EPON Operation
1113 Southbound Port
1114 1:n Splitter
1115 Fiber Spans
1116 Optical Node Units
1117 Northbound Port
1119 Fiber Span
1201 Virtual Optical Edge Device
1202 Southbound Port
1203 Southbound Port
1204 Southbound Port
1205 Southbound Port
1206 Remote Radio
1207 Remote Radio
1208 Remote Radio
1209 Remote Radio
1210 Devices
1211 Northbound Pori
1212 Network Controller
1213 Fiber Span
1300 Computer System
1301 Memory
1302 RAM
1303 Cache
1304 Storage
1305 Program Code
1306 Processor
1307 I/O Interface(s)
1308 Network Adapter
1309 Bus
1310 Display
1311 External Device(s)

Figure 8:
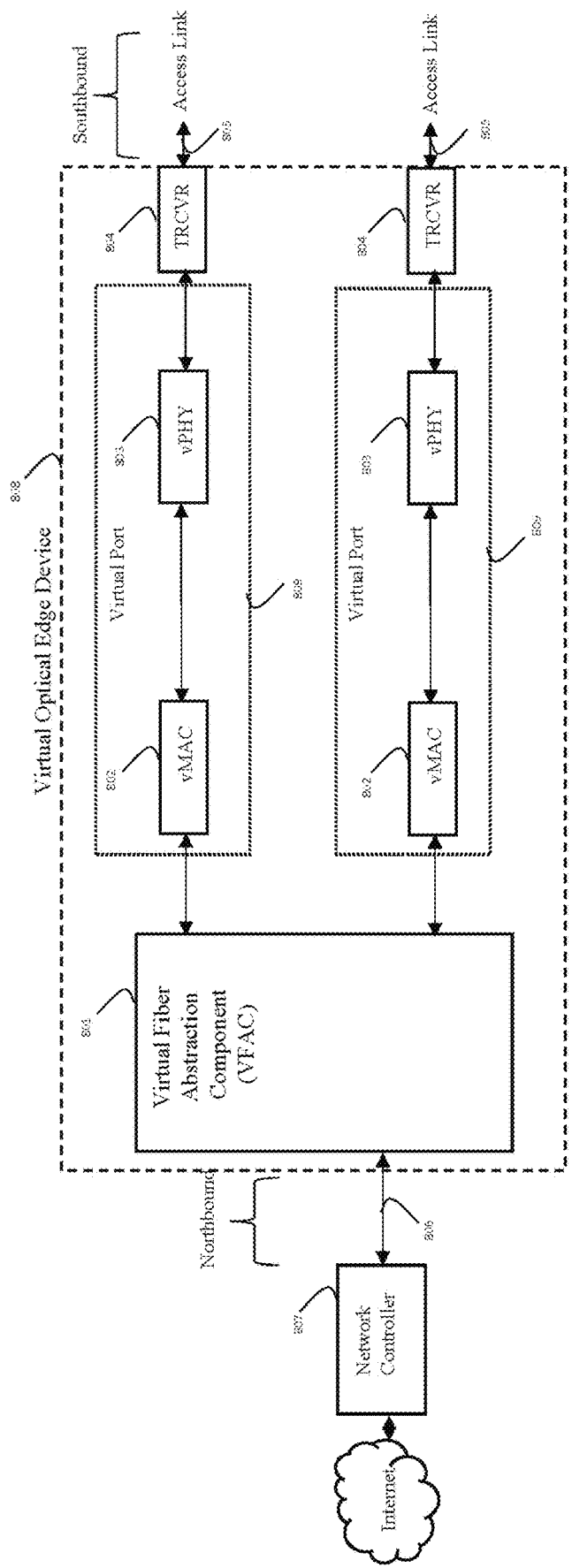
FIG. 8 illustrates a first exemplary embodiment of a system for virtualizing the optical edge of a fiber-based access network according to the invention.

FIG. 8 illustrates a first exemplary embodiment of a system for virtualizing the optical edge of a fiber-based access network according to the invention. Virtual Optical Edge Device (VOED) 808 replaces the traditional access function of the network. VOED 808 provides a unified or single-standard northbound API to network controller 807 and handles the access technology/protocol specific controls and monitoring of each of a set of virtualized southbound ports. The VOED 808 enables the network controller 807 to use an API operating under a single protocol or standard to provision, control, monitor, and manage data traffic of VOED's southbound virtual ports operating under a plurality of access technologies or protocols, without requiring the network controller 807 to have knowledge of the protocols under which the southbound virtual ports are operating. The network controller 807 also switches and routes data from the Internet. The system comprises a network controller 807 coupled to the Virtual Optical Edge Device (VOED) 808 via optical span 806 using the IP protocol. In one embodiment of the invention, the network controller 807 is a collection of physical hardware and software components. In another embodiment of this invention, the network controller 807 is virtualized cloud-based software, such as Software Defined Networking (SDN), virtual Cable Termination System (vCMTS), or cellular network core. VOED 808 has a single or a plurality of access link 805, where each access link 805 has the flexibility of adhering to variety of industry standards and non-standard access protocols by way of programming its associated virtual port 809 resources. The programming of the virtual ports 809 allows each access link 805 to operate at different bit rates and different access protocols used in cable-TV applications, in fiber to the premises applications in fixed wireless access (FWA) applications and in cellular applications. These protocols include, but not limited to, DOCSIS, broadband digital return (DDR), Radio frequency over glass (RFoG), active ethernet, APON, BPON, GPON, EPON, 10G-EPON, DPoE, XGS-PON, TWDM-PON, NG-PON2, eCPRI, RoE, CPRI or OBSAI. In one embodiment of this invention, transceiver (TRCVR) 804 is a multi-rate Optical to Electrical (O/E) and Electrical to Optical (E/O) converter. In another embodiment of this invention, TRCVR 804 is a pluggable E/O & O/E converter that can be chosen to support the desired protocol and desired bit rate. Virtual port 809 comprises virtual Physical Layer (vPHY) resources 803 and virtual Medium Access Control (vMAC) resources 802. Each vPHY and vMAC include programmable hardware and/or software component, where each vPHY and vMAC can be programmed to perform the desired physical layer and the MAC layer functions, respectively, of a chosen protocol. Different sets of associated vMAC 802 and vPHY 803 can be programmed according to different access protocols independently of other sets of associated vMACs 802 and vPHYs 803. This enables different access links 805 to operate different specifically chosen protocol and bit rates independently of the configuration of each other. Each vMAC 802 is isolated from the other vMAC's. Virtual Fiber Abstraction Component (VFAC) 801 bridges the virtual port 809 with the network controller 807. Existing communication systems tightly couple subscriber data and communication channel controls. These two important data types are carried over the same communication channel, resulting in a tightly integrated system where every element in the network has been specifically designed to accommodate each access technology specific controls. In contrast, the VFAC 801 segregates the data plane from the control & management plane, and presents a unified Application Program Interface (API) to the network controller 807 on it northbound interface while performing all the protocol specific monitoring, control and management function of desired access protocol on the southbound links, as described further below with reference to FIG. 10.

Figure 9:
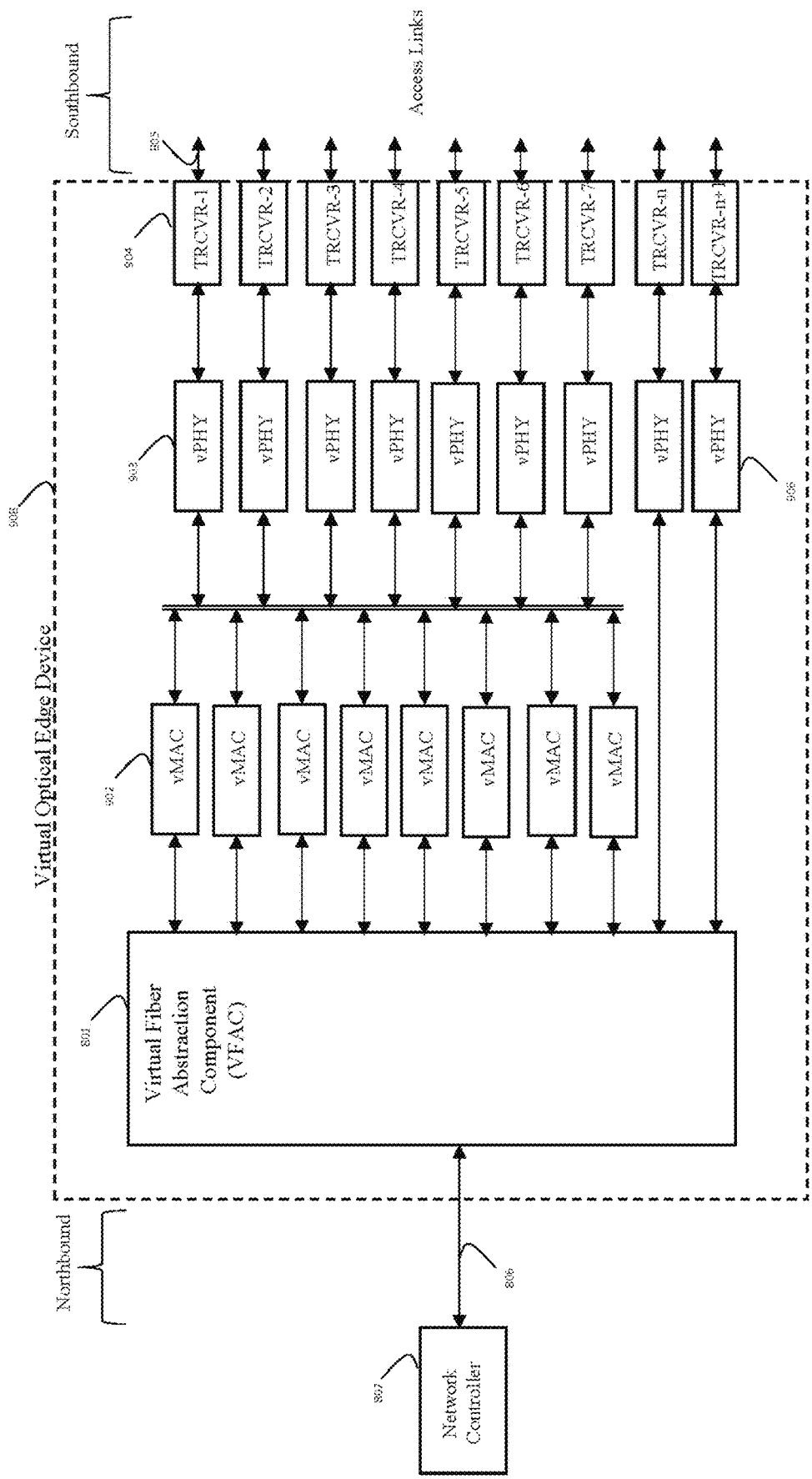
FIG. 9 illustrates a second embodiment of the invention for virtualizing the optical edge of fiber-based access network.

FIG. 9 illustrates a second embodiment of the invention for virtualizing the optical edge of fiber-based access network, where the main components of VOED 908 are shown. A pool of virtual Physical Layer resources 903 and pool of virtual Medium Access Control resources 902 are arranged in a structure that allows flexible association of one or more of these resources to a specific southbound physical port 904 (one of transceivers TRCVR-1 through TRCVR-n+1). Furthermore, these virtual MAC/PHY resources are programmed to perform their respective functions according to a specific access technology/protocol. The Virtual Fiber Abstraction Component (VFAC) 801 performs the specific access technology/protocol related provisioning, controls, monitoring, data flow management for access links 805 and for the API used to interface with the network controller 807. The VFAC 801 thus "isolates" or shields the network controller 807 from the specific access protocol related functions for the access links 805, as described further below.

The programmable components of the invention include programmable hardware, software, or a combination of programmable hardware and software. For example, and without limitation, the programmable hardware and/or software may include field-programmable field arrays (FPGAs). Other types of hardware and/or software components may be used to implement the programmable components of the invention without departing from the spirit and scope of the invention. The programming of the components can be implemented by a processing system, described further below with reference to FIG. 13. In one embodiment, the executable instructions for the configuration of the programmable components are downloaded from a remote source.

Figure 10:
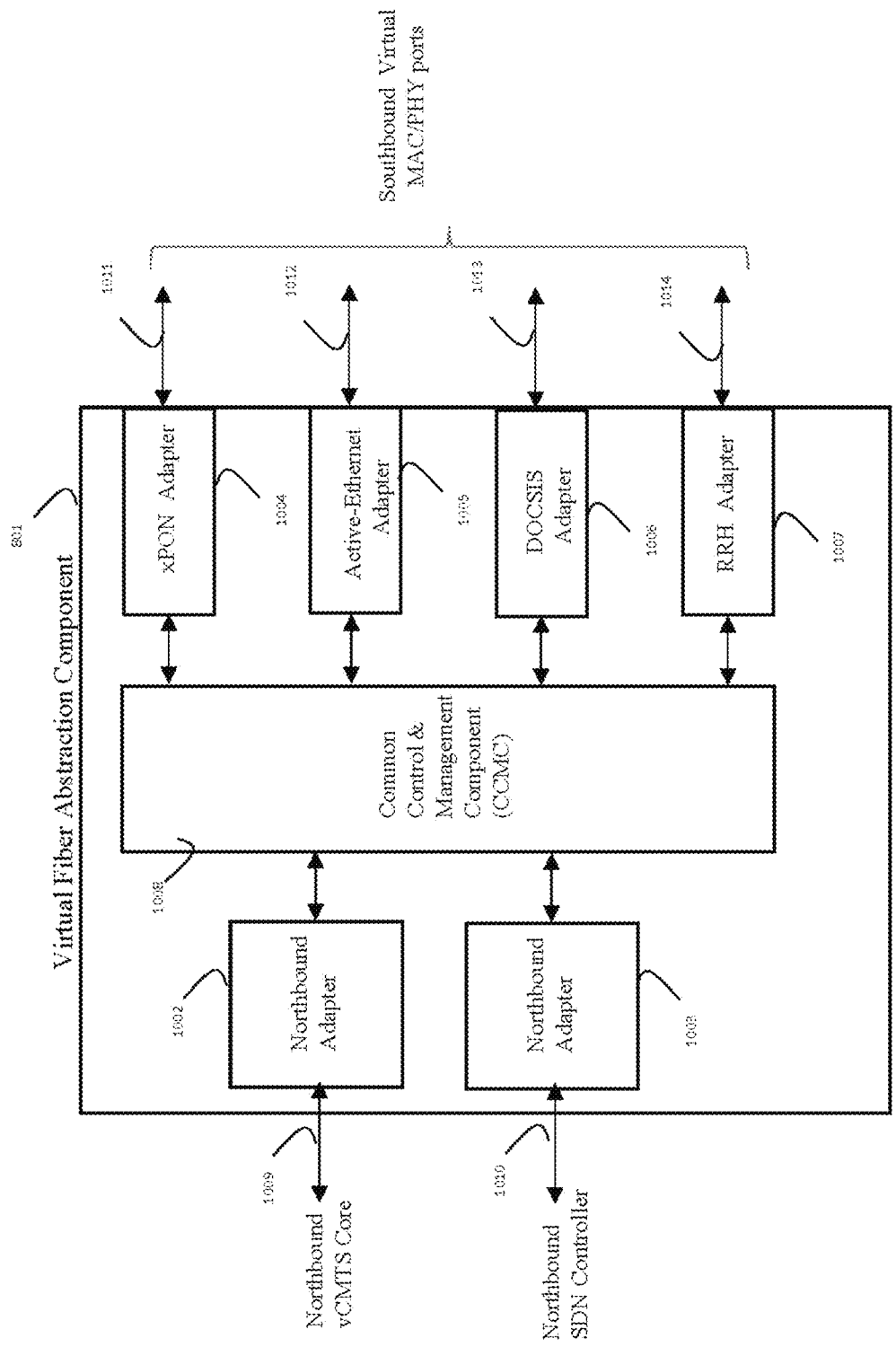
FIG. 10 illustrates an embodiment of the Virtual Fiber Abstraction Component according to the invention.

FIG. 10 illustrates an embodiment of the Virtual Fiber Abstraction Component 801 according to the invention. A plurality of protocol-specific adapters (1004, 1005, 1006, 1007) are used to mediate between the common control & management component (CCMC) 1008 and the respective southbound virtual MAC/PHY ports 1011-1014. This mediation contains protocol specific control and management details in the associated adapter. This ultimately shields the network controller 807 from access protocol specific details, thereby simplifying the interface with the southbound virtual MAC/PHY ports 1011-1014 from the perspective of the network controller 807. The same network controller 807 is thus able to support a broader range of access technologies and protocols.

The Common Control & Management Component (CCMC) 1008 performs the mediation between northbound adapters (1002, 1003) and southbound adapters (1004, 1005, 1006, 1007). The CCMC 1008 contains logical upstream and downstream data flow profile registers per each device residing on its southbound ports. These registers are tabulated by data received from the northbound adapters (1002, 1003). The CCMC 1008 in turn translates the data flow profiles into specific access technology control and management data that is passed to the relevant southbound adapter (1004, 1005, 1006, 1007).

As an example, the CCMC 1008 receives logical upstream and downstream data flow from its northbound adapter (1002, 1003), stores this data in its data flow registers associated with a particular xPON ONU, translates these flow data to a set of xPON specific flow and management registers that are passed on to southbound xPON adapter 1004, where these data is used to set xPON OLT specific flow and management parameters, such as DBA, ONU registration, LLID and other xPON specific settings. xPON adapter 1004 handles static and dynamic virtual OLT initialization and configuration, fault management, performance management, security management, ONU registration & ONU provisioning, DBA parameter setting, ONU ranging and ONU discovery, ONU authentication, and ONU connection management. This process results in the treatment of connected ONU devices by the network controller 807 as a collection of standard Ethernet ports. The net result of the process as described are containment of access protocol specific complexities locally to the VOED 808/908, while streamlining and simplifying the network controller monitoring, management and control tasks.

In cases were the network controller 807 is a vCMTS type, northbound adapter 1002 receives data from the CCMC 1008 destined for the vCMTS, encapsulates the data in L2TP packets according to DOCSIS DEPT specifications, and transmits the encapsulated data to the vCMTS via northbound link 1009. In the reverse direction, L2TP encapsulated data that conforms to DOCSIS UEPI specifications is received from the vCMTS by the northbound adapter 1002, The northbound adapter 1002 extracts the payload data and sends the payload data to the CCMC 1008. Northbound adapter 1002 also extract timing information from its northbound link 1009 and synchronizes the rest of the system to the vCMTS clock. The CCMC 1008 includes time stamping and other timing mechanisms as specified by DOCSIS 3.1 Remote-PHY specifications. vCMTS core is not limited to interwork only with DOCSIS adapter 1006, and the unified northbound API as described allows the vCMTS core to interwork with some or all southbound adapters (1004, 1005, 1006, 1007).

In cases were the network controller 807 is a SDN type controller, northbound adapter 1003 receives data from the CCMC 1008 destined for SDN controller, encapsulates the data in IP packets with VLAN ID tags that identify the originating southbound interface name, ID and port number, and transmits the resulting packets to the SDN controller. In the reverse direction, data packets are received from the SDN controller, which includes management, control, and data payload. The management and control data are extracted by the northbound adapter 1003 and sent to the CCMC 1008 to be stored in its logical upstream and downstream data flow profile registers of a connected device residing on a southbound optical access link, whose address is derived from the VLAN ID tag send by the SDN controller. The payload packets are treated in a similar fashion, passed to the CCMC 1008 internal registers that are assigned to the payload data.

Referring to both FIGS. 9 and 10, in some applications such as Remote-PHY, it is advantageous to share MAC resources across multiple PHYs resources as illustrated in FIG. 9, where a system with multiple vPHY resources 906 can be directly coupled to the VFAC 801 and interwork with the vCMTS 1009 (FIG. 10) that contains the DOCSIS MAC. According to this embodiment, the corresponding southbound DOCSIS adapter 1006 (FIG. 10) mediate between the CCMC 1008 and the respective southbound virtual DOCSIS vPHY ports 1006. This mediation contains DOCSIS specific control and management details in the associated adapter. This ultimately shields the vCMTS 1009 from DOCSIS specific PHY details, thereby simplifying the interface with the southbound virtual PHY ports 1006 from the perspective of the vCMTS 1009. The same vCMTS is thus able to support a broader range of southbound adapters 1006, where some adapters are associated with a DOCSIS vMAC & vPHY resources and other DOCSIS adapters 1006 are associated with only a DOCSIS vPHY resource. The functions of CCMC 1008 remains similar to earlier descriptions, where it receives logical upstream and downstream data flow from its northbound adapter 1002 and stores this data in its data flow registers associated with a particular southbound DOCSIS adapter 1006. This data is used to set DOCSIS specific forward and reverse physical layer parameters such as timing & synchronization, upstream & downstream channel settings, upstream bandwidth allocations, cable modem ranging parameters and cable modem service request parameter settings. In this embodiment, VFAC 801 in conjunction with vPHY 906 or vPHY/VMAC 903/904, provide a level of abstraction via a unified or single-standard northbound API to the network controller 807.

Figure 11:
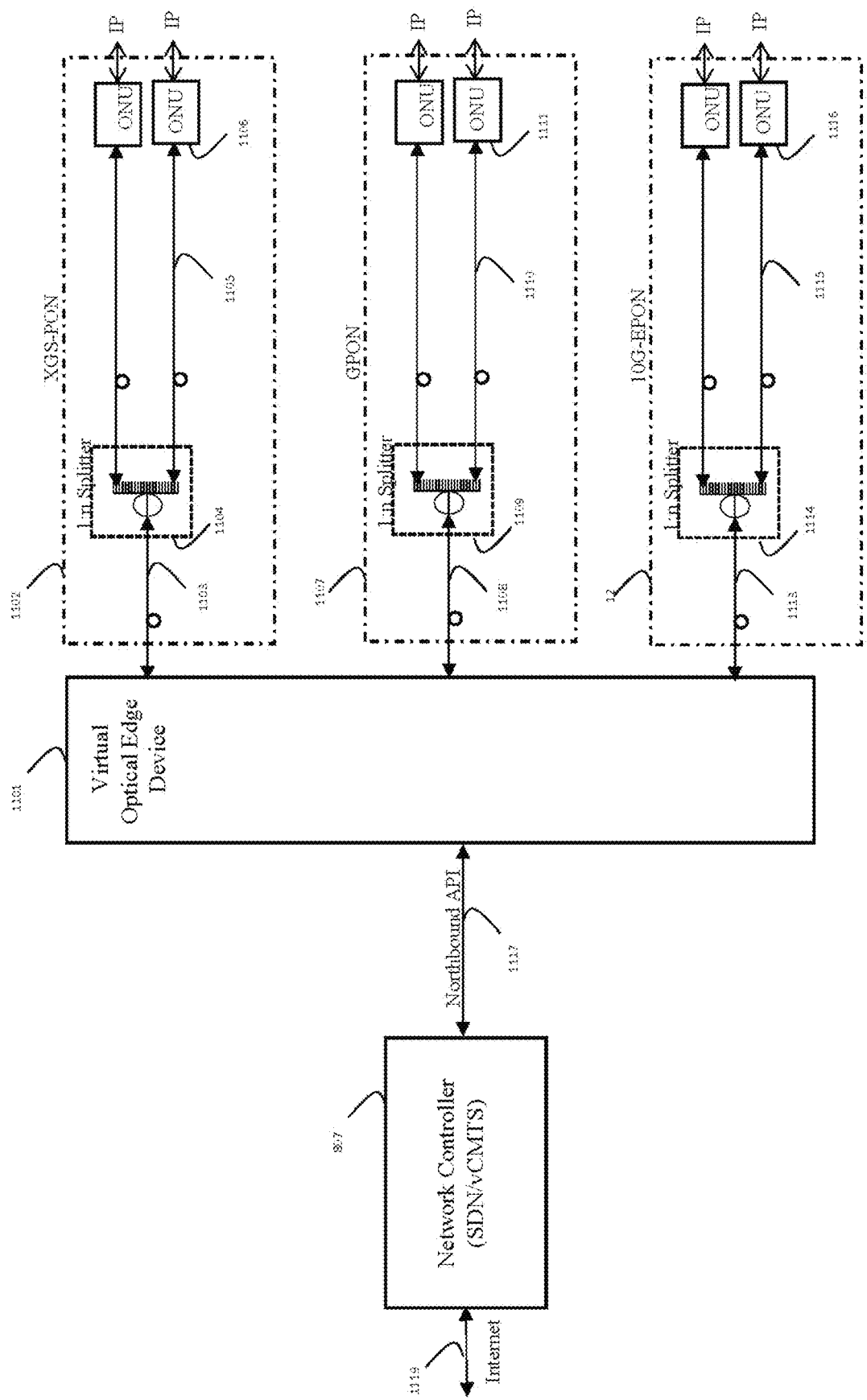
FIG. 11 illustrates a first embodiment of a system for virtualizing the optical edge of fiber-based access network according to the invention.

FIG. 11 illustrates a first embodiment of a system for virtualizing the optical edge of fiber-based access network according to the invention. The VOED's 1101 southbound ports (1103, 1108, 1113) are programmed to perform a specific PON protocol independently of each other, while the VOED 1101 presents a uniform and single-standard API to the network controller 807 through its northbound port 1117. In this example, southbound port 1103 is programmed for XGS-PON operation, southbound port 1108 is programmed for GPON operation, and southbound port 1113 is programmed for 10G-EPON operation. The invention as described has several advantages over existing systems. The VOED 1101 can be deployed initially with one type of PON protocol, and over time, as customer demand and requirements changed, the VOED southbound ports (1103, 1108, 1113) can be reprogrammed to perform a different version of the PON protocol to meet the new demand, without requiring any changes to the VOED 1101. A second advantage of the VOED 1101 is the flexibility to program the southbound ports (1103, 1108, 1113) to perform different PON protocols to accommodate different types of customers from a single VOED 1101. Service operators can program one set of southbound ports to perform one type of PON protocol, for example XGS-GPON, to support business customers, while programming another set of southbound ports to perform a different type of PON protocol, for example 10G-EPON protocol, to support residential customers.

Figure 12:
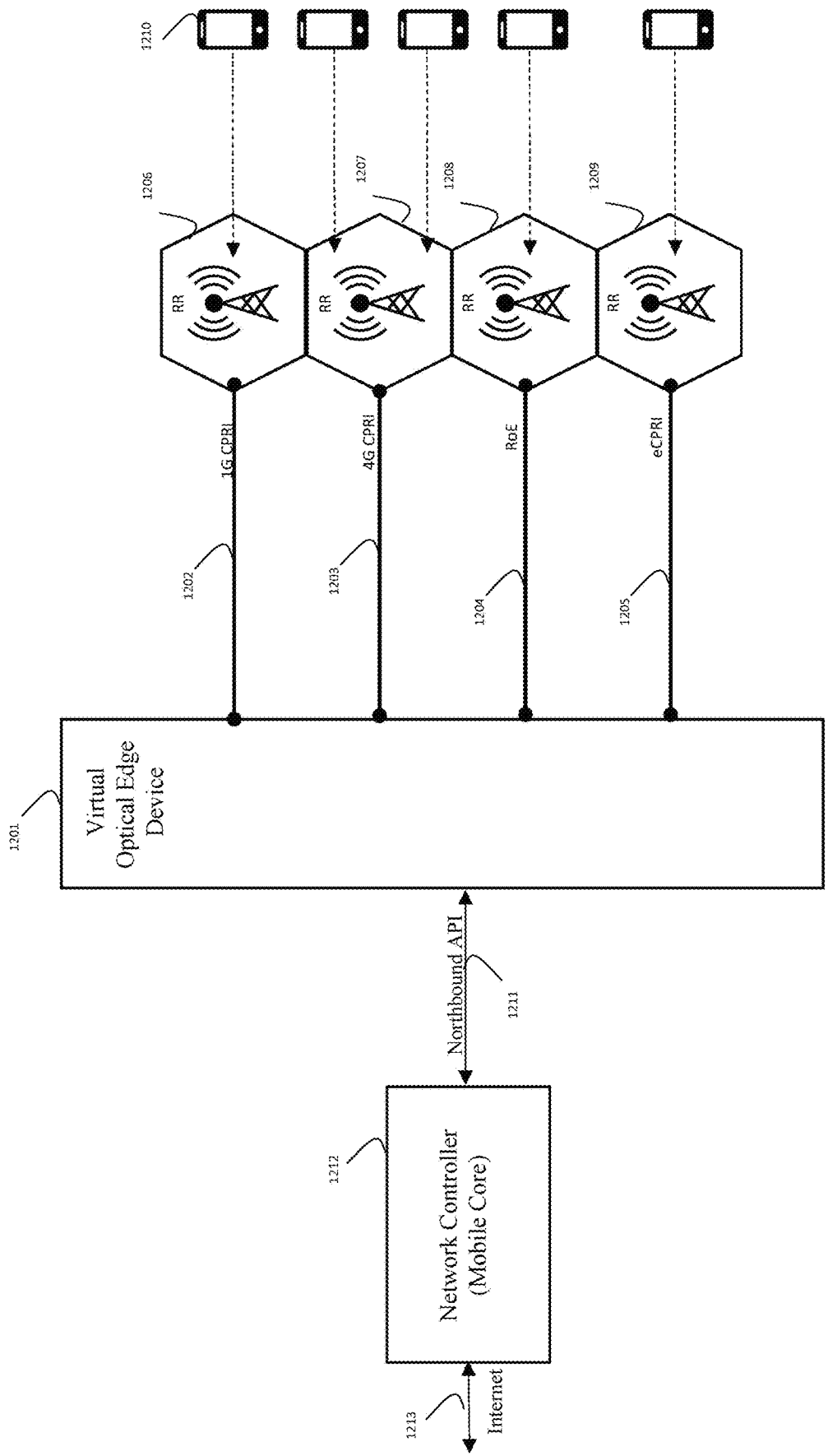
FIG. 12 illustrates a second embodiment of a system for virtualizing the optical edge of fiber-based access network according to the invention.

FIG. 12 illustrates a second embodiment of a system for virtualizing the optical edge of fiber-based access network according to the invention. The VOED's 1201 southbound ports are programmed to perform semi-custom access protocols that are used for connection with remote radios. A semi-custom protocol contains requirements of a standard protocol with proprietary functions added. Remote Radio 1206 in this example is a 3G device made by vendor-A with its semi-custom 1G CPRI optical link 1202. Remote Radio 1207 in this example is a 4G device made by vendor-B with its semi-custom 4G CPRI optical link 1203. Remote Radio 1208 in this example is a 4G device made by vendor-C with Radio over Ethernet (RoE) optical link 1204. Remote Radio 1209 in this example is a 5G device made by vendor-D with eCPRI optical link 1205. Each southbound port of the VOED 1201 is programmed to match the protocol used by its corresponding remote radio. Southbound port 1202 is programmed to match vendor A semicustom 1G CPRI protocol, southbound port 1203 is programmed to match vendor B 4G CPRI protocol, southbound port 1204 is programmed to match vendor C RoE protocol, and southbound 1205 is programmed to match vendor D eCPRI protocol. VOED 1201 processes the data from the various southbound ports and presents a uniform API to network controller 1212 through its northbound port 1211. The invention as described has several advantages over existing systems. The VOED 1201 enables mobile service operators to use a mix of remote radios made by different vendors in a single mobile network, with each remote radio having a semi-custom protocol. Additional advantage of this invention is spectrum sharing across different generations of wireless systems. Instead of operators sharing 5G and 4G spectrum only if all deployed remote radios are made by a single vendor, the invention enables mobile operators to deploy a rich mix of remote radio equipment, thus enabling the full integration of 4G and 5G networks. 5G remote radios from one vendor are able to share 4G RF spectrum with 4G remote radios from a different vendor since both radio types are controlled by a single network controller 1212.

Figure 13:
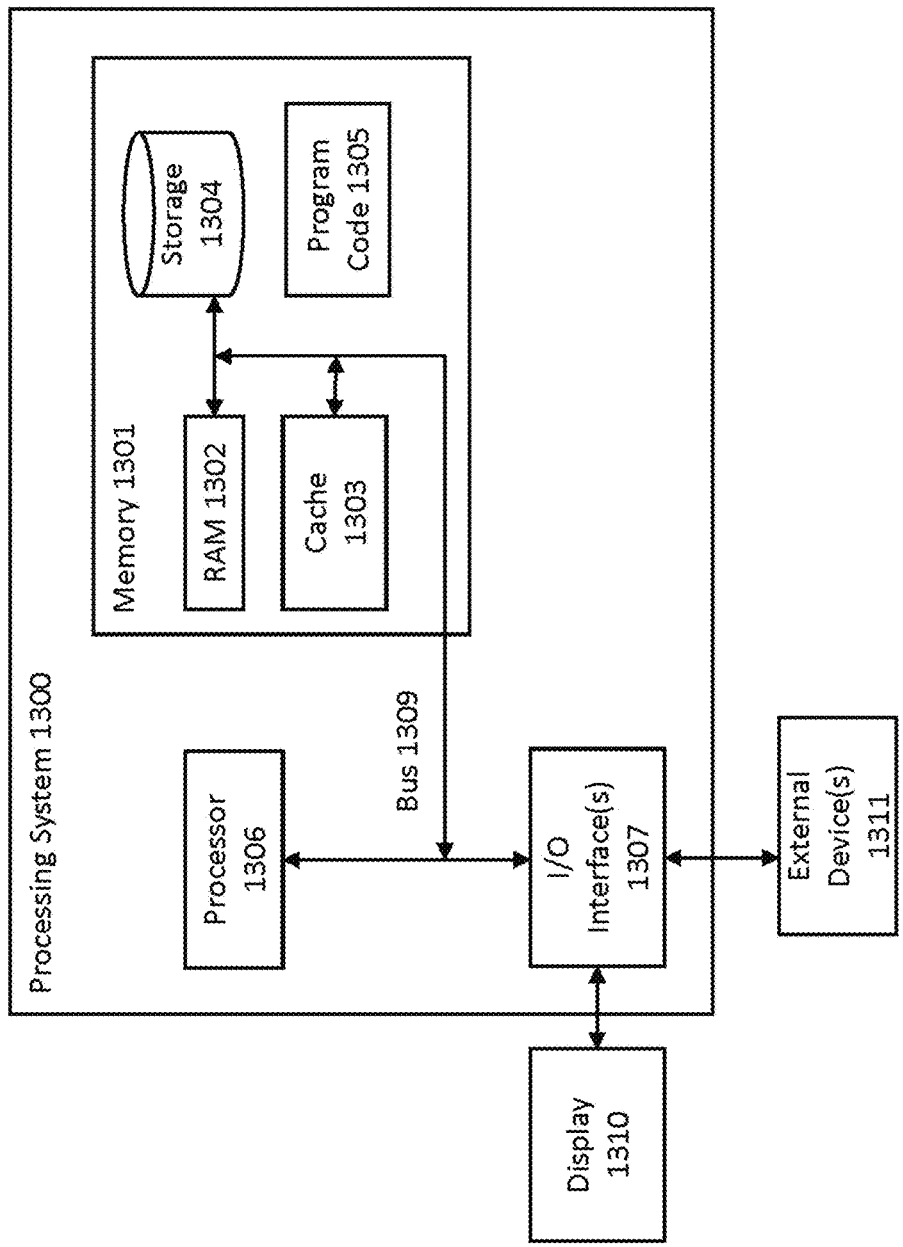
FIG. 13 illustrates a processing system for implementing the VOED or other components of the embodiments of the invention.

FIG. 13 illustrates a processing system for implementing the \TOED or other components of the embodiments of the invention. The processing system 1300 is operationally coupled to a processor or processing units 1306, a memory 1301, and a bus 1309 that couples various system components, including the memory 1301 to the processor 1306. The bus 1309 represents one or more of any of several types of bus structure, including a memory bus or memory controller, a peripheral bus, an accelerated graphics port, and a processor or local bus using any of a variety of bus architectures. The memory 1301 may include computer readable media in the form of volatile memory, such as random access memory (RAM) 1302 or cache memory 1303, or non-volatile storage media 1304. The memory 1301 may include at least one program product having a set of at least one program code module 1305 that are configured to carry out the functions of embodiment of the present, invention when executed by the processor 1306. The computer system 1300 may also communicate with one or more external devices 1311, such as a display 1310, via I/O interfaces 1307.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A virtual optical edge device, comprising:
a virtual fiber abstraction component (VFAC) coupled to a northbound port, the northbound port coupled to a network controller over a single-standard application program interface (API) configured with a network protocol;
a set of southbound virtual ports, comprising:
a plurality of virtual medium access control (vMAC) resources coupled to the virtual fiber abstraction component; and
a plurality of virtual physical layer (vPHY) resources coupled to the plurality of vMAC resources and a plurality of access links coupled to a plurality of optical ports, the plurality of access links configured to perform functions according to a plurality of fiber access protocols,
wherein a first given southbound virtual port of the set of southbound virtual ports is coupled to a first given access link of the plurality of access links, the first given access link configured to perform functions according to a first given fiber access protocol of the plurality of fiber access protocols, wherein the first given southbound virtual port comprises:
a first given vMAC resource of the plurality of vMAC resources coupled to the VFAC and programmed to perform MAC layer functions of the first given fiber access protocol; and
a first given vPHY resource of the plurality of vPHY resources coupled to the first given vMAC and to the first given access link, the first given vPHY resource programmed to perform physical layer functions of the first given fiber access protocol,
wherein a second given southbound virtual port of the set of southbound virtual ports is coupled to a second given access link of the plurality of access links, the second given access link configured to perform functions according to a second given fiber access protocol different from the given fiber access protocol, wherein the second given southbound virtual port comprises:
a second given vMAC resource of the plurality of vMAC resources coupled to the VFAC and programmed to perform MAC layer functions of the second given fiber access protocol; and
a second given vPHY resource of the plurality of vPHY resources coupled to the second given vMAC and to the second given access link, the second given vPHY resource programmed to perform functions according to the second fiber access protocol,
wherein the VFAC is programmed to mediate between the single-standard API and the given southbound virtual port by translating data flow between the first given fiber access protocol and the network protocol,
wherein the VFAC is further programmed to mediate between the second given southbound virtual port and the single-standard API by translating data flow between the second given fiber access protocol and the network protocol.

2. The device of claim 1, wherein the set of southbound virtual ports is coupled to a set of remote radios, wherein each southbound virtual port of the set of southbound virtual ports is programmed to perform functions according to a fiber access, protocol used by a corresponding remote radio of the set of remote radios.

3. The device of claim 1, wherein the single-standard API interfaces with the network controller selected from the group consisting of a physical network controller and a virtual network controller.

4. The device of claim 1, wherein the single-standard API interfaces with the network controller selected from the group consisting of a cable modem termination system (CMTS); a virtual CMTS; a virtual software defined networking (SDN) controller; a mobile core controller; a virtual mobile core controller.

\* \* \* \* \*